US012649273B2

(12) United States Patent
Ozaki et al.

(10) Patent No.: US 12,649,273 B2
(45) Date of Patent: Jun. 9, 2026

(54) METHOD FOR MANUFACTURING RESIN CONTAINER AND APPARATUS FOR MANUFACTURING SAME

(71) Applicant: NISSEI ASB MACHINE CO., LTD., Nagano (JP)

(72) Inventors: Yasuo Ozaki, Nagano (JP); Toshiteru Oike, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 302 days.

(21) Appl. No.: 18/015,643

(22) PCT Filed: Jul. 12, 2021

(86) PCT No.: PCT/JP2021/026173
§ 371 (c)(1),
(2) Date: Jul. 7, 2023

(87) PCT Pub. No.: WO2022/014540
PCT Pub. Date: Jan. 20, 2022

(65) Prior Publication Data
US 2024/0116236 A1 Apr. 11, 2024

(30) Foreign Application Priority Data

Jul. 17, 2020 (JP) ................................. 2020-122556

(51) Int. Cl.
*B29C 49/06* (2006.01)
*B29C 49/02* (2006.01)
(Continued)

(52) U.S. Cl.
CPC .............. *B29C 49/06* (2013.01); *B29C 49/22* (2013.01); *B29C 49/6419* (2022.05);
(Continued)

(58) Field of Classification Search
CPC ......... B29C 49/06; B29C 49/22; B29C 49/64; B29C 49/6419; B29C 2049/023; B29C 49/08; B29C 49/48
See application file for complete search history.

(56) References Cited

U.S. PATENT DOCUMENTS

| | | | |
|---|---|---|---|
| 5,364,585 A | 11/1994 | Takeuchi |
| 6,077,579 A | 6/2000 | De Laforcade |
| | (Continued) | | |

FOREIGN PATENT DOCUMENTS

| | | | |
|---|---|---|---|
| JP | 60-75009 | 5/1985 | |
| JP | S6075009 * | 8/1985 | ............. B29C 49/08 |
| | (Continued) | | |

OTHER PUBLICATIONS

JPS6075009 English translation prepared Dec. 6, 2024 (Year: 2024).*

(Continued)

*Primary Examiner* — Alison L Hindenlang
*Assistant Examiner* — Shibin Liang
(74) *Attorney, Agent, or Firm* — GREENBLUM & BERNSTEIN, P.L.C.

(57) ABSTRACT

A manufacturing method of a resin container having a light-transmitting region and a non-light-transmitting region extending in an axial direction includes: a first injection molding step of injection-molding a first layer of a preform having a convex portion extending in the axial direction using a first resin material having a light-transmitting property; a second injection molding step of injecting a colored second resin material on a surface side on which the convex portion of the first layer is formed and laminating a colored second layer in a region excluding the convex portion of the first layer while exposing the convex portion in the axial direction; and a blow molding step of blow-molding the (Continued)

(a)

(b)

preform in a state of having residual heat from injection molding.

4 Claims, 9 Drawing Sheets

(51) Int. Cl.
| | |
|---|---|
| *B29C 49/22* | (2006.01) |
| *B29C 49/64* | (2006.01) |
| *B29L 31/00* | (2006.01) |

(52) U.S. Cl.
CPC .. *B29C 2049/023* (2013.01); *B29C 2049/222* (2013.01); *B29C 2949/0715* (2022.05); *B29C 2949/3034* (2022.05); *B29K 2995/002* (2013.01); *B29K 2995/0026* (2013.01); *B29L 2031/712* (2013.01)

(56) References Cited

U.S. PATENT DOCUMENTS

| | | | |
|---|---|---|---|
| 11,365,028 B2 | 6/2022 | Yama et al. | |
| 2008/0251487 A1* | 10/2008 | Semersky | B29C 49/22 |
| | | | 264/537 |
| 2016/0185488 A1* | 6/2016 | Hosokoshiyama | |
| | | | B29C 45/1646 |
| | | | 428/34.1 |
| 2017/0157800 A1 | 6/2017 | De Cuyper et al. | |
| 2019/0337218 A1* | 11/2019 | Kawamura | B29C 49/12 |

FOREIGN PATENT DOCUMENTS

| | | | |
|---|---|---|---|
| JP | 01-33291 | 10/1989 | |
| JP | 3-76624 A | 4/1991 | |
| JP | H 4-7683 B2 | 2/1992 | |
| JP | 2931428 B2 | 5/1999 | |
| JP | 2015-9451 A | 1/2015 | |
| JP | 2017202716 | * 10/2017 | B29C 49/64 |

OTHER PUBLICATIONS

JPS6075009 English translation prepared Mar. 2, 2025 (Year: 2025).*

International Search Report issued in International Bureau of WIPO Patent Application No. PCT/JP2021/026173, dated Aug. 10, 2021, along with an English translation thereof.

Written Opinion issued in International Bureau of WIPO Patent Application No. PCT/JP2021/026173, dated Aug. 10, 2021, along with an English translation thereof.

Office Action, dated May 30, 2025, in Chinese family member application No. 202180060175.X with English language translation thereof.

* cited by examiner (a)          (c)

(b)          (d)

(a)

(b)

(a)

(b)

(a)

(b)

METHOD FOR MANUFACTURING RESIN CONTAINER AND APPARATUS FOR MANUFACTURING SAME

BACKGROUND OF THE INVENTION

Field of the Invention

The present invention relates to a manufacturing method of a resin container and a manufacturing apparatus thereof.

Description of the Related Art

In the related art, in order to improve a light shielding property with respect to contents and an aesthetic appearance of a container, there is known a resin container formed to have a container body portion which is colored to be opaque. When the container body portion is opaque, it is difficult to grasp the remaining amount of the contents. Therefore, in this type of resin container, a window including a vertically long transparent region is also formed in the container body portion.

A so-called resin container with a window, in which a window is formed in a container body portion, is mainly manufactured by an extrusion blow molding method, but a manufacturing method by a three-layer molding method or an insert molding method has also been proposed (see JP 6061250 B2, JP H01-33291 Y and JP S60-75009 U).

However, when a resin container with a window is manufactured by the extrusion blow molding method, aesthetic appearance and dimensional accuracy of the container generally deteriorate. Moreover, in the extrusion blow molding method, post-process work is essential, and a large amount of waste material is also generated.

When a resin container with a window is manufactured by the three-layer molding method, a special hot runner mold is required to manufacture the resin container. Further, in the three-layer molding method, a transparent material and a coloring material are simultaneously injected so as to have a desired shape, but the injection control is significantly difficult, which causes an increase in manufacturing costs.

In addition, when a resin container with a window is manufactured by the insert molding method, it is required to store, in advance, a molded component having a preform inserted thereinto. In addition, when the preform is inserted into the molded component, the preform needs to be sufficiently cooled, and it is required to perform a step of reheating the cooled preform before blow molding, which causes an increase in manufacturing costs.

SUMMARY OF THE INVENTION

A manufacturing method of a resin container according to an aspect of the present invention includes: injection-molding a first layer of a preform having a convex portion extending in an axial direction on an inner peripheral surface or an outer peripheral surface as a first injection molding, the preform being formed in a bottomed cylindrical shape, using a first resin material having a light-transmitting property; injecting a colored second resin material on a surface side on which the convex portion of the first layer is formed and laminating a colored second layer in a region excluding the convex portion of the first layer while exposing the convex portion in the axial direction as a second injection molding; molding the preform obtained in the second injection molding in a state of having heat retained during injection molding to manufacture the resin container. The resin container has a light-transmitting region extending in the axial direction by shaping the convex portion and a non-light-transmitting region by shaping the second layer.

Further features of the present invention will become apparent from the following description of exemplary embodiments with reference to the attached drawings.

DESCRIPTION OF THE EMBODIMENTS

Figure 1:
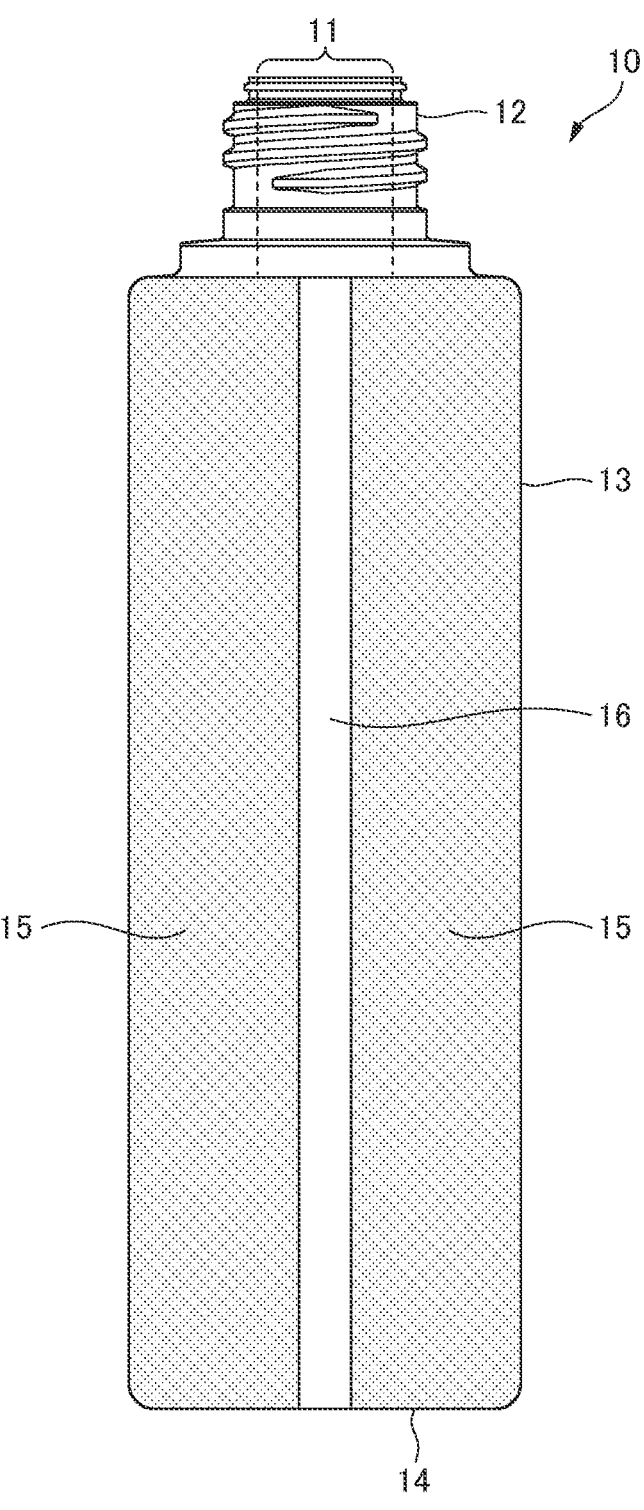
FIG. 1 is a diagram illustrating an example of a container of the present embodiment.

Hereinafter, embodiments of the present invention will be described with reference to the drawings.

In the embodiment, for easy understanding, structures and elements other than the main part of the present invention will be described in a simplified or omitted manner. In the drawings, the same elements are denoted by the same reference numerals. It is noted that shapes, dimensions, and the like of the respective elements illustrated in the drawings are schematically illustrated, and do not indicate actual shapes, dimensions, and the like.

<Configuration Example of Resin Container>

First, a configuration example of a resin container (hereinafter, also simply referred to as a container) 10 according to the present embodiment will be described with reference to FIG. 1.

FIG. 1 is a diagram illustrating an example of the container 10 of the present embodiment.

The container 10 illustrated in FIG. 1 is formed of, for example, a resin material such as polyethylene terephthalate (PET). The container 10 includes a neck portion 12 having a mouth portion 11 at the upper end thereof, a cylindrical body portion 13 continuous from the neck portion 12, and a bottom portion 14 continuous from the body portion 13.

Although not illustrated, the body portion 13 and the bottom portion 14 of the container 10 have a structure in which an inner layer facing the container inner surface and an outer layer facing the container outer surface are laminated. The structure is formed by blow molding a preform 20 to be described later.

In addition, the body portion 13 of the container 10 has a non-light-transmitting region 15 colored and configured to have a low property of transmitting light (light-transmitting property) and a light-transmitting region 16 having a higher light-transmitting property than the non-light-transmitting region 15. The non-light-transmitting region 15 is a region that occupies most of the body portion 13 of the container 10, and is colored in order to improve a light shielding property with respect to contents and aesthetic appearance of the container. The non-light-transmitting region 15 can be formed by using a colored resin material in either the outer layer or the inner layer of the preform 20 having a laminated structure.

The light-transmitting region 16 is a stripe-shaped region partially formed in a part of the body portion 13 in the circumferential direction and formed to extend in the axial direction of the container 10. The light-transmitting region 16 functions as a window for checking the remaining amount of contents from the outside of the container 10. The light-transmitting region 16 can be formed by using a transparent resin material for one of the outer layer and the inner layer of the preform 20 having a laminated structure and partially providing a region in which the colored resin material does not overlap the transparent resin material in the radial direction.

<Configuration Example of Preform>

FIGS. 2A to 2D illustrate an example of the preform 20 applied to the manufacturing of the container 10 of the present embodiment.

Figure 2:
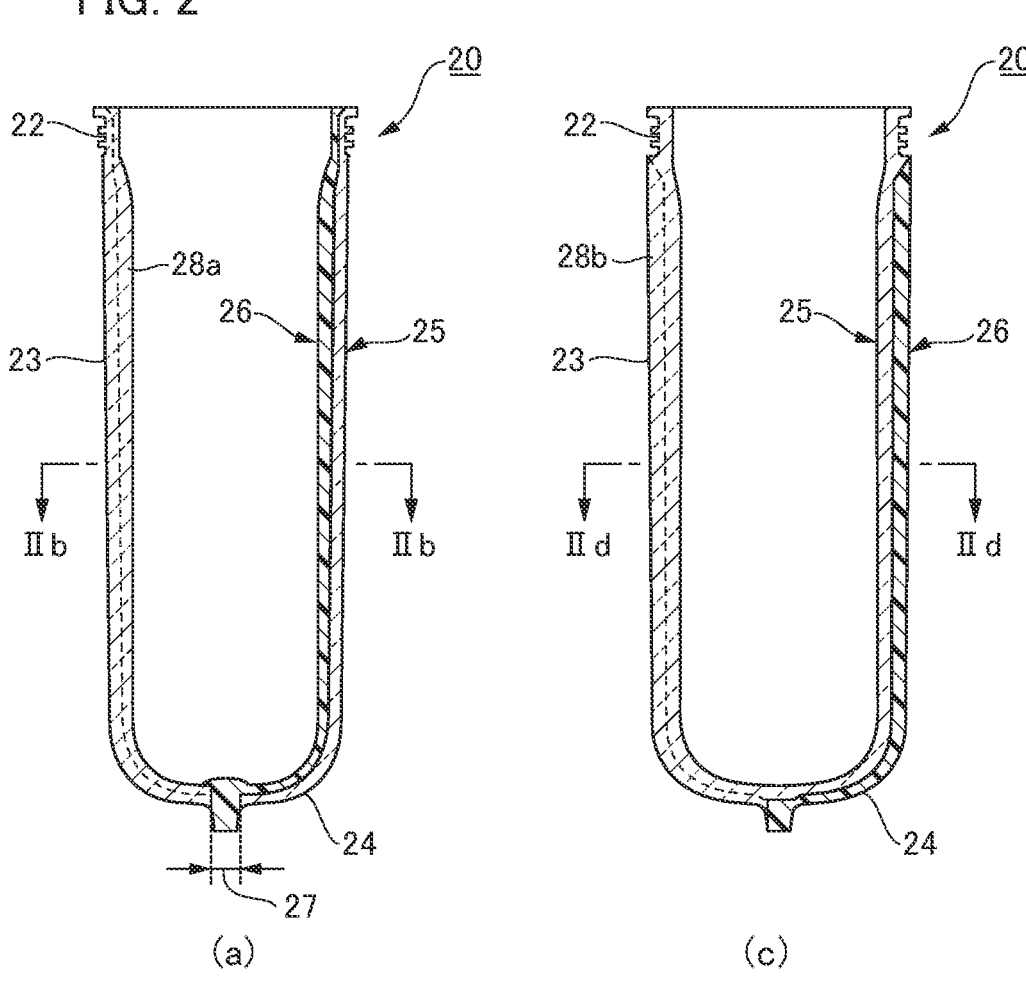
FIGS. 2A to 2D are diagrams illustrating an example of a preform of the present embodiment.
Figure 2:
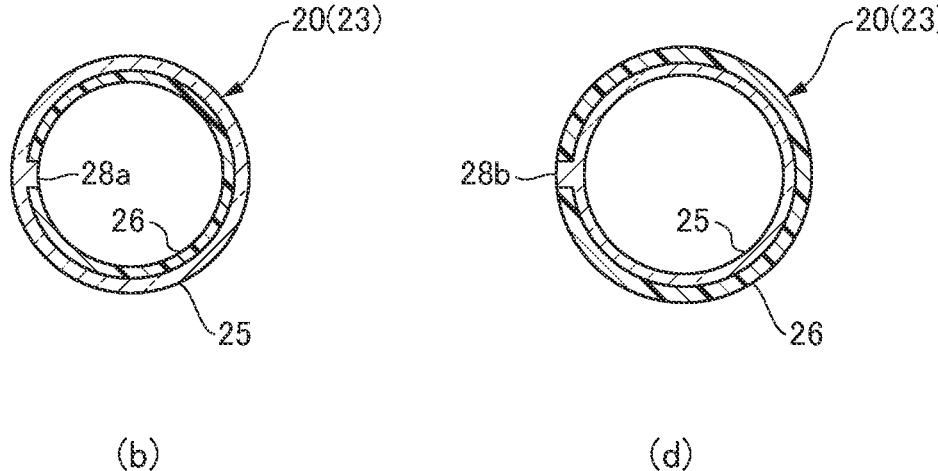

FIG. 2A is a longitudinal cross-sectional view of the preform 20 of a first example of the present embodiment, and FIG. 2B is a cross-sectional view taken along line IIb-IIb of FIG. 2A. FIG. 2C is a longitudinal cross-sectional view of the preform of a second example of the present embodiment, and FIG. 2D is a cross-sectional view taken along line IId-IId of FIG. 2C.

The entire shape of the preform 20 illustrated in FIGS. 2A and 2C is a bottomed cylindrical shape in which one end side is opened and the other end side is closed. Each of the preforms 20 of the first example and the second example includes a body portion 23 formed in a cylindrical shape, a bottom portion 24 that closes the other end side of the body portion 23, and a neck portion 22 formed in an opening on one end side of the body portion 23. In addition, each of the preforms 20 of the first example and the second example has a multilayer structure in which a transparent first layer 25 and a colored second layer 26 are laminated. The first layer 25 and the second layer 26 are formed by two-stage injection molding as described later.

In the preform 20 of the first example illustrated in FIGS. 2A and 2B, the transparent first layer 25 is formed on the outer peripheral side, and the colored second layer 26 is formed on the inner peripheral side. In the preform 20 of the first example, the neck portion is formed in the first layer 25 located on the outer peripheral side, and the second layer 26 is laminated on the inner peripheral side from the neck portion 22 to the bottom portion 24 of the first layer 25. In addition, in the preform 20 of the first example, a hole 27 is formed at the center of the bottom portion of the first layer 25, and the hole 27 of the first layer 25 is closed from the inside by the second layer 26.

The first layer of the preform 20 of the first example has a convex portion 28a formed to protrude toward the inner peripheral side thereof and formed in a part thereof in the circumferential direction. The convex portion 28a extends in the axial direction of the preform 20 from the neck portion 22 to the bottom portion 24 of the preform 20. The tip of the convex portion 28a formed to protrude in the radial direction toward the inner peripheral side faces the inner peripheral surface of the preform 20, and as illustrated in FIG. 2B, the tip of the second layer 26 and the tip of the convex portion 28a are flush with each other on the inner peripheral surface of the preform 20.

In the region other than the convex portion 28a of the first layer 25, since the colored second layer 26 is located on the inner peripheral side of the transparent first layer 25, the color of the second layer 26 is shown from the outer side through the transparent first layer 25. Therefore, the region other than the convex portion 28a of the first layer 25 corresponds to the non-light-transmitting region 15 of the container 10 after blow molding.

On the other hand, in the region of the convex portion 28a of the first layer 25, only the first layer 25 exists in the radial direction, and the colored second layer 26 is not formed. Therefore, light is well transmitted in the region of the convex portion 28a of the first layer 25. Therefore, the region of the convex portion 28a of the first layer 25 corresponds to the light-transmitting region 16 of the container 10 after blow molding.

On the other hand, in the preform 20 of the second example illustrated in FIGS. 2C and 2D, the transparent first layer 25 is formed on the inner peripheral side, and the colored second layer 26 is formed on the outer peripheral side. In the preform 20 of the second example, the neck portion 22 is formed in the first layer 25 located on the inner peripheral side, and the second layer 26 is laminated on the outer peripheral side from the body portion 23 to the bottom portion 24 of the first layer 25.

The first layer 25 of the preform 20 of the second example has a convex portion 28b formed to protrude toward the outer peripheral side thereof and formed in a part thereof in the circumferential direction. The convex portion 28b extends in the axial direction of the preform 20 from the body portion 23 to the bottom portion 24 of the preform 20. The tip of the convex portion 28b formed to protrude in the radial direction toward the outer peripheral side faces the outer peripheral surface of the preform 20, and as illustrated in FIG. 2D, the tip of the second layer 26 and the tip of the convex portion 28b are flush with each other on the outer peripheral surface of the preform 20.

In the region other than the convex portion 28b of the first layer 25, since the second layer 26 faces the outer peripheral surface, the color of the second layer 26 is shown as it is from the outside. Therefore, the region other than the convex portion 28b of the first layer 25 corresponds to the non-light-transmitting region 15 of the container 10 after blow molding.

On the other hand, in the region of the convex portion 28b of the first layer 25, only the first layer 25 exists in the radial direction, and the colored second layer 26 is not formed. Therefore, light is well transmitted in the region of the convex portion 28b of the first layer 25. Therefore, the region of the convex portion 28b of the first layer 25 corresponds to the light-transmitting region 16 of the container 10 after blow molding.

Specifications such as shapes and dimensions of the first layer 25 and the second layer 26 are appropriately adjusted depending on the shape of container 10 to be manufactured.

Hereinafter, a resin material forming the first layer 25 is also referred to as a first resin material, and a resin material forming the second layer 26 is also referred to as a second resin material. For example, the first resin material is transparent and the second resin material is internally colored by addition of a colorant. Here, a colorant may also be added to the first resin material within a range in which relatively high light-transmitting property with respect to the second resin material can be secured. On the other hand, the second resin material may have a light-transmitting property to a certain extent as long as the light-transmitting property of the second resin material is lower than that of the first resin material.

The first resin material and the second resin material are both thermoplastic synthetic resins, and can be appropriately selected according to the specifications of the container 10. Specific examples of the material include PET, polyethylene naphthalate (PEN), polycyclohexanedimethylene terephthalate (PCTA), Tritan ((registered trademark): copolyester manufactured by Eastman Chemical), polypropylene (PP), polyethylene (PE), polycarbonate (PC), polyethersulfone (PES), polyphenylsulfone (PPSU), polystyrene (PS), cyclic olefin polymer (COP/COC), polymethyl methacrylate: acrylic (PMMA), and polylactic acid (PLA).

The combination of the first resin material and the second resin material can be appropriately set according to the specifications of the container 10, but it is preferable to combine materials having high weldability with each other. As an example, the first resin material and the second resin material may be the same type of resin materials (for example, PETs) having different compositions of colorants. Alternatively, one resin material may be PP, and the other resin material may be PET.

<Description of Manufacturing Apparatus of Container>

Figure 3:
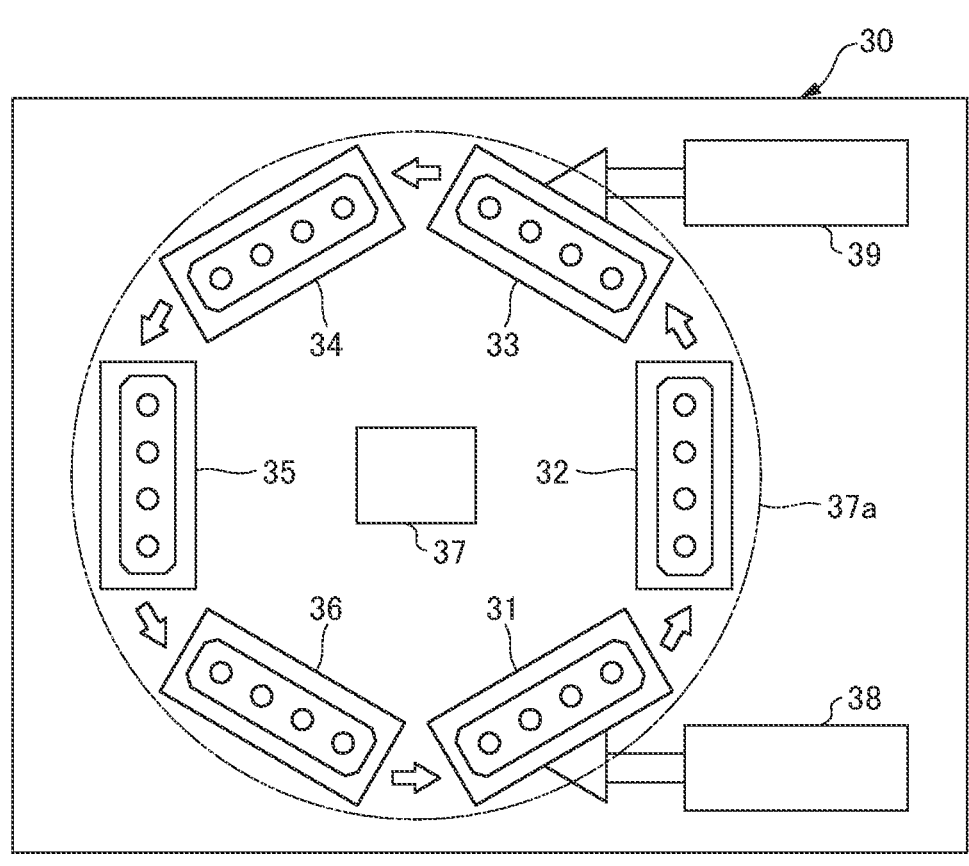
FIG. 3 is a diagram schematically illustrating a configuration of a blow molding apparatus of the present embodiment.

FIG. 3 is a diagram schematically illustrating a configuration of a blow molding apparatus according to the present embodiment. A blow molding apparatus 30 of the present embodiment is an example of a manufacturing apparatus of a container, and adopts a hot parison method (also referred to as a one-stage method) in which the container 10 is blow-molded by utilizing residual heat (internal heat quantity) from injection molding without cooling the preform 20 to room temperature.

The blow molding apparatus 30 includes a first injection molding unit 31, a first temperature adjustment unit 32, a second injection molding unit 33, a second temperature adjustment unit 34, a blow molding unit 35, a taking-out unit 36, and a conveyance mechanism 37. The first injection molding unit 31, the first temperature adjustment unit 32, the second injection molding unit 33, the second temperature adjustment unit 34, the blow molding unit 35, and the taking-out unit 36 are disposed at positions rotated by a predetermined angle (for example, sixty degrees) around the conveyance mechanism 37.

(Conveyance Mechanism 37)

The conveyance mechanism 37 includes a rotating plate 37a that rotates around an axis in a direction perpendicular to the paper surface of FIG. 3. On the rotating plate 37a, one or more neck molds 37b (not illustrated in FIG. 3) configured to hold the neck portion 22 of the preform 20 (or the neck portion 12 of the container 10) are disposed at each predetermined angle. The conveyance mechanism 37 rotates the rotating plate 37a to sequentially convey the preform 20 (or the container 10) held by the neck mold 37b to the first injection molding unit 31, the first temperature adjustment unit 32, the second injection molding unit 33, the second temperature adjustment unit 34, the blow molding unit 35, and the taking-out unit 36. The conveyance mechanism 37 can also move the rotating plate 37a upwards and downwards, and also performs operations related to mold closing and mold opening (mold releasing) in the first injection molding unit 31 and the second injection molding unit 33.

(First Injection Molding Unit 31)

The first injection molding unit 31 includes a cavity mold 40, a core mold 41, and a hot runner mold 42, and manufactures the first layer 25 of the preform 20. As illustrated in FIG. 3, a first injection device 38 that supplies the first resin material to the hot runner mold 42 is connected to the first injection molding unit 31.

Figure 4:
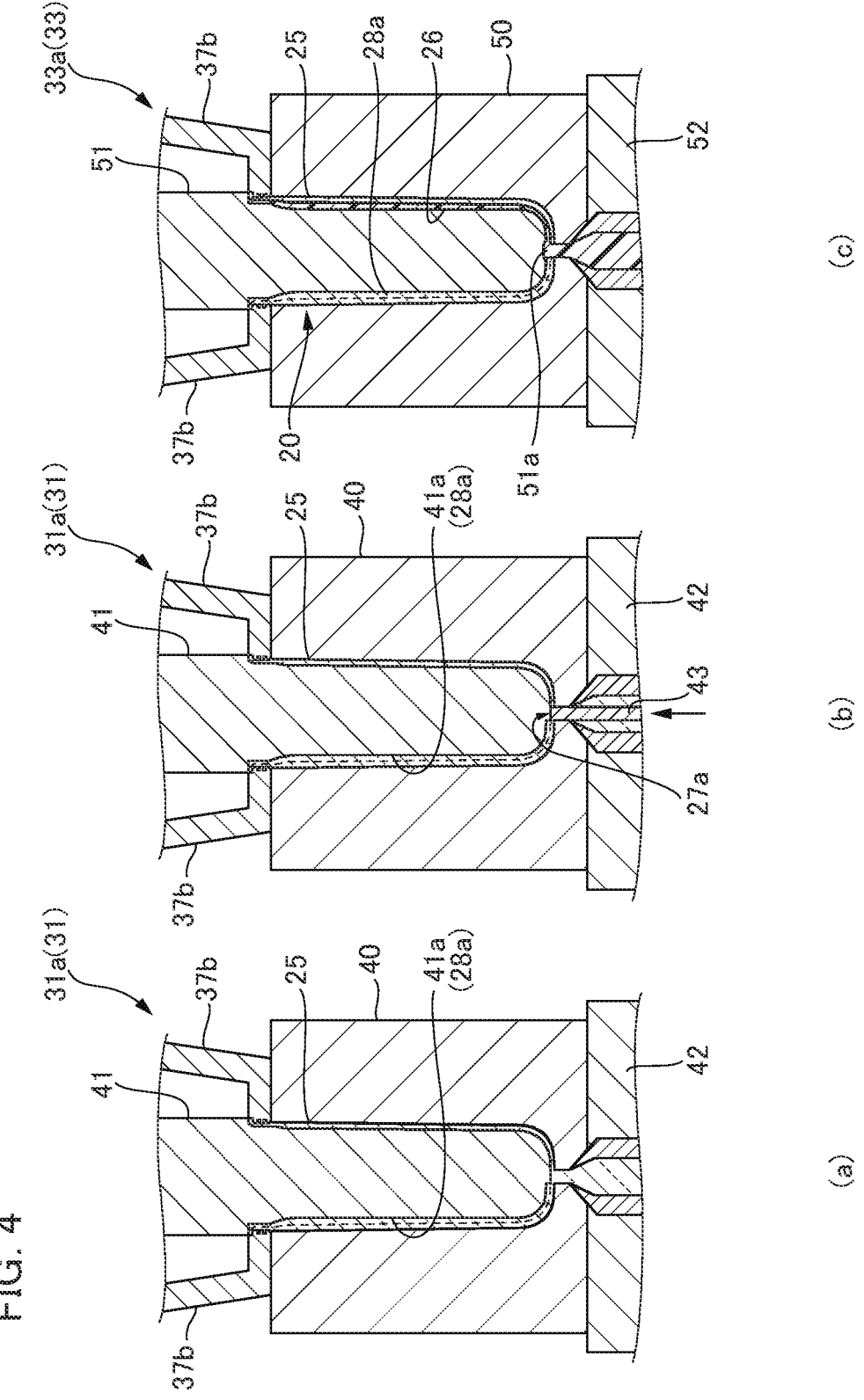
FIGS. 4A to 4C are diagrams illustrating a step of manufacturing a preform according to a first example of the present embodiment.
Figure 5:
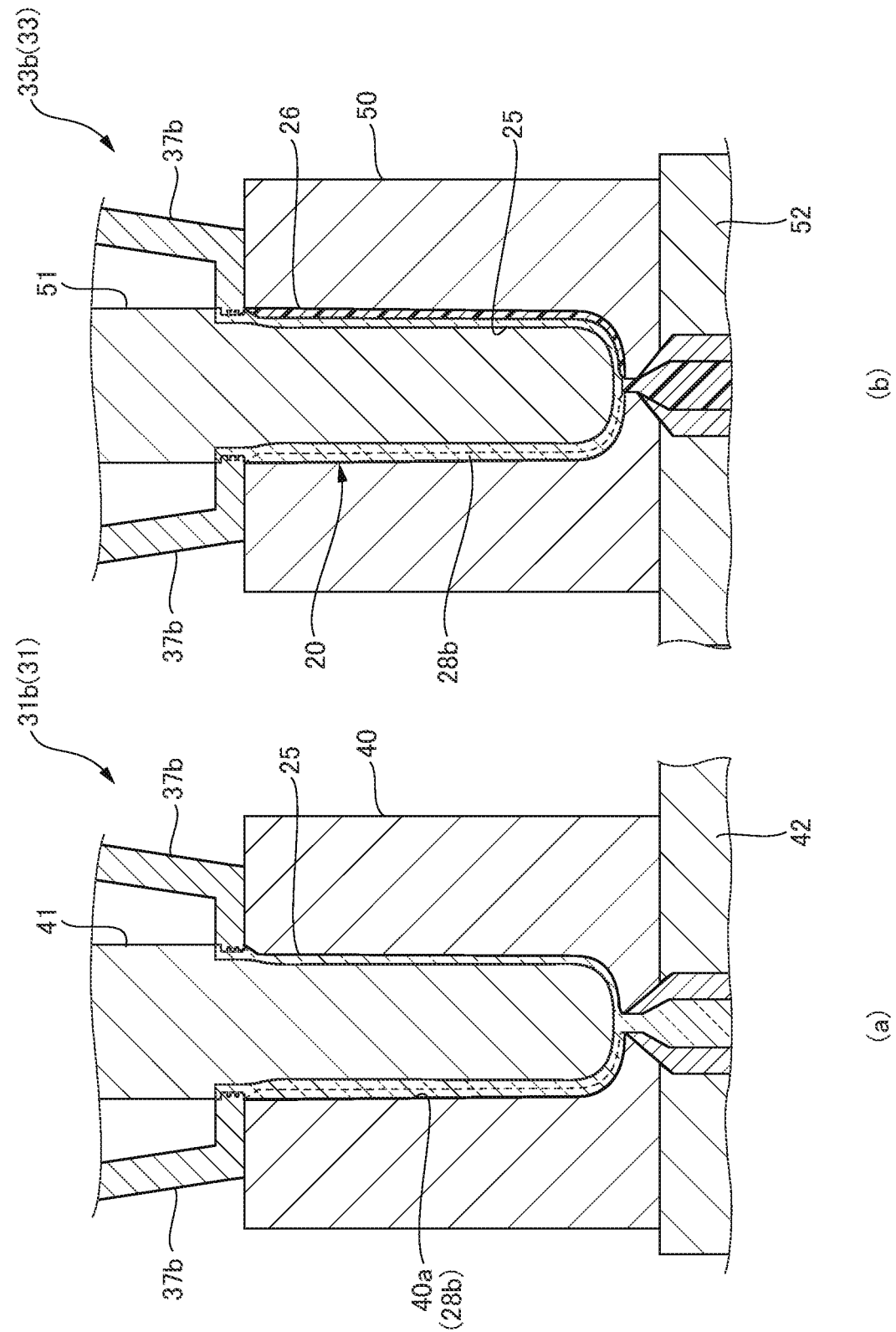
FIGS. 5A and 5B are diagrams illustrating a step of manufacturing a preform of a second example of the present embodiment.

FIGS. 4A and 4B illustrate a first injection molding unit 31a that molds the first layer 25 of the preform 20 (FIGS. 2A and 2B) of the first example. FIG. 5A illustrates a first injection molding unit 31b that molds the first layer 25 of the preform (FIGS. 2C and 2D) of the second example. In this specification, when it is not necessary to distinguish the first injection molding unit 31a and 31b, the same are collectively referred to as the first injection molding unit 31.

As illustrated in FIGS. 4A and 5A, in the first injection molding unit 31, the cavity mold 40, the core mold 41, and the neck mold 37b of the conveyance mechanism 37 are closed to form a mold space of the first layer 25. Then, by pouring the first resin material from the first injection device 38 into the mold space via the hot runner mold 42, the first layer 25 of the preform 20 is manufactured in the first injection molding unit 31.

As illustrated in FIG. 4A, a groove 41a for forming the convex portion 28a of the first layer 25 is formed in the core mold 41 of the first injection molding unit 31a. Thus, the first injection molding unit 31a can form the convex portion 28a on the inner periphery of the first layer 25.

On the other hand, as illustrated in FIG. 5A, the cavity mold 40 of the first injection molding unit 31b is formed with a groove 40a for forming the convex portion 28b of the first layer 25. As a result, the first injection molding unit 31b can form the convex portion 28b on the outer periphery of the first layer 25.

Each radial depth (that is, the protrusion amount of the convex portions 28a and 28b in the radial direction) of the groove 41a of the first injection molding unit 31a and the groove 40a of the first injection molding unit 31b is set to be larger than the thickness of the second layer 26.

As illustrated in FIG. 4B, in the first injection molding unit 31a, a valve pin 43 that is movable in the axial direction up to a position close to the core mold 41 is provided inside the hot runner mold 42. The valve pin 43 is accommodated in the hot runner mold 42 until the mold space is filled with the first resin material, and protrudes up to the position close to the core mold 41 after the mold space is filled with the first resin material. By such movement of the valve pin 43 during injection molding, a thin film portion 27a in which the thickness of the resin material is thinner than that of the peripheral portion can be formed at the center of the bottom portion of the first layer 25.

In addition, even when the molds of the first injection molding unit 31 are opened, the neck mold 37b of the conveyance mechanism 37 is not opened, but holds and conveys the first layer 25 of the preform 20 as it is. The number of the preforms 20 simultaneously molded by the first injection molding unit 31 (that is, the number of containers 10 that can be simultaneously molded by the blow molding apparatus 30) can be appropriately set. FIG. 3 illustrates a configuration in which four preforms are simultaneously conveyed.

(First Temperature Adjustment Unit 32)

The first temperature adjustment unit 32 includes a mold unit for temperature adjustment (temperature adjustment pot and temperature adjustment core) (not illustrated). The first temperature adjustment unit 32 cools the first layer 25 of the preform 20 in a high temperature state after injection molding by accommodating the first layer 25 in a mold unit maintained at a predetermined temperature. The first temperature adjustment unit 32 also has a function of adjusting the temperature distribution of the first layer 25 of the preform 20 to a predetermined state before the preform 20 is conveyed to the second injection molding unit 33.

(Second Injection Molding Unit 33)

The second injection molding unit 33 includes a cavity mold 50, a core mold 51, and a hot runner mold 52, and injection-molds the second layer 26 on the outer peripheral portion or the inner peripheral portion of the first layer 25. As illustrated in FIG. 3, a second injection device 39 that supplies the second resin material to the hot runner mold 52 is connected to the second injection molding unit 33.

FIG. 4C illustrates a second injection molding unit 33*a* that molds the second layer 26 of the preform 20 of the first example. FIG. 5B illustrates a second injection molding unit 33*b* that molds the second layer 26 of the preform 20 of the second example. In this specification, when it is not neces- sary to distinguish the second injection molding units 33*a* and 33*b*, the same are collectively referred to as the second injection molding unit 33.

The second injection molding unit 33*a* accommodates the first layer 25 of the preform 20 injection-molded by the first injection molding unit 31*a*. As illustrated in FIG. 4C, in a state where the molds of the second injection molding unit 33*a* are closed, a mold space is formed between the inner peripheral side of the first layer 25 and the surface of the core mold 51, the mold space being formed from the neck portion of the first layer 25 to the bottom portion thereof. By filling the mold space with the second resin material from the second injection device 39 via the hot runner mold 52, the second layer 26 is molded on the inner peripheral side of the first layer 25. As a result, the preform 20 of the first example is manufactured.

A curved recessed portion 51*a* is formed at the tip of the core mold 51 of the second injection molding unit 33*a*. When the molds are closed, the recessed portion 51*a* faces the outlet of the second resin material located at the center of the cavity mold, and forms a space of a resin reservoir between the recessed portion 51*a* and the hole 27 of the first layer 25.

Furthermore, in the second injection molding unit 33*a*, the axial depth of the mold space of the cavity mold 50 accommodating the first layer 25 may be shorter than the axial length of the first layer 25. As a result, when the first layer 25 is accommodated in the cavity mold 50, the bottom portion of the first layer 25 is pressed against the bottom surface of the cavity mold 50 and the bottom portion of the first layer 25 and the cavity mold 50 come into contact with each other, thereby making it possible to suppress generation of a gap between the bottom portion of the first layer 25 and the cavity mold 50.

On the other hand, the second injection molding unit 33*b* accommodates the first layer 25 of the preform 20 injection- molded by the first injection molding unit 31*b*. As illustrated in FIG. 5B, in a state where the molds of the second injection molding unit 33*b* are closed, a mold space is formed between the outer peripheral side of the first layer 25 and the inner surface of the cavity mold 50, the mold space being formed from the body portion of the first layer 25 to the bottom portion thereof. By filling the mold space with the second resin material from the second injection device 39 via the hot runner mold 52, the second layer 26 is molded on the outer peripheral side of the first layer 25. As a result, the preform 20 of the second example is manufactured.

(Second Temperature Adjustment Unit 34)

The second temperature adjustment unit 34 performs temperature equalization and removal of uneven tempera- ture of the preform 20 manufactured by the second injection molding unit 33, and adjusts the temperature of the preform

20 to a temperature suitable for final blowing (for example, about 90° C. to 105° C.). Further, the second temperature adjustment unit 34 also has a function of cooling the preform 20 in a high temperature state after injection molding.

Figure 7:
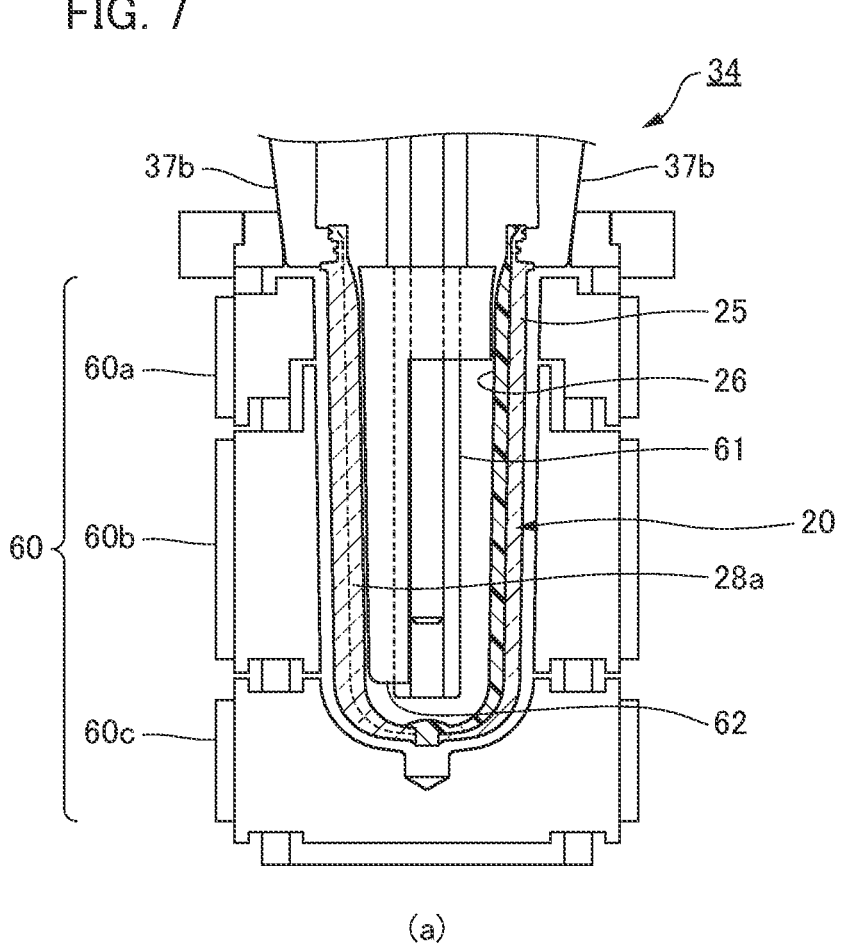
FIGS. 7A and 7B are diagrams illustrating a configuration example of a second temperature adjustment unit.
Figure 7:
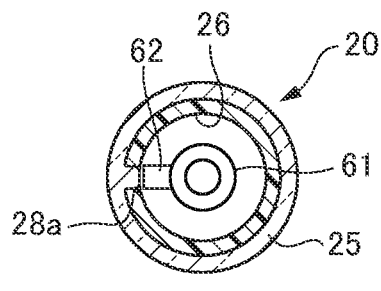

As illustrated in FIGS. 7A and 7B, the second temperature adjustment unit 34 includes a cavity mold (pot mold) 60 and a heating rod 61.

The cavity mold 60 is a mold having a temperature control space capable of accommodating the preform 20 manufac- tured by the second injection molding unit 33. The cavity mold 60 is divided into upper and lower three stages in the axial direction of the preform 20, and includes an upper stage mold 60*a*, a middle stage mold 60*b*, and a lower stage mold 60*c* in order from the top.

A heater is provided in each of the upper stage mold 60*a*, the middle stage mold 60*b*, and the lower stage mold 60*c*, or a flow path (not illustrated) through which a temperature adjustment medium (cooling medium) flows is formed therein. Therefore, the temperature of the cavity mold 60 is maintained at a predetermined temperature by the heater and the temperature adjustment medium. It is noted that the temperature distribution of the preform 20 may be changed in the axial direction by changing the temperature of the heater of each of the upper stage mold 60*a*, the middle stage mold 60*b*, and the lower stage mold 60*c*, and the temperature of the temperature adjustment medium.

The heating rod 61 is inserted into the preform 20 and disposed so as to be movable forwards and rearwards with respect to the neck mold 37*b* holding the preform 20. FIG. 7A illustrates a state in which the heating rod 61 is inserted into the neck mold 37*b*.

A heating piece 62 extending in the axial direction is attached to the heating rod 61. As illustrated in FIG. 7B, the heating piece 62 is partially disposed at a position corre- sponding to the convex portion 28*a* (28*b*) of the preform 20 in the circumferential direction, and has a function of locally heating the convex portion 28*a* (28*b*) of the preform 20.

(Blow Molding Unit 35)

The blow molding unit 35 blow-molds the preform 20, the temperature of which has been adjusted by the second temperature adjustment unit 34, to manufacture the con- tainer 10.

The blow molding unit 35 includes a blow cavity mold, which is a pair of split molds corresponding to the shape of the container 10, a bottom mold, a stretching rod, and an air introduction member (all not illustrated). The blow molding unit 35 blow-molds the preform 20 while stretching the same. As a result, the preform 20 is formed into a shape of blow cavity mold, and the container 10 can be manufac- tured.

(Taking-Out Unit 36)

The taking-out unit 36 is configured to open the neck portion 12 of the container 10 manufactured by the blow molding unit 35 from the neck mold 37*b* and to take out the container 10 to the outside of the blow molding apparatus 30.

<Description of Manufacturing Method of Container>

Figure 8:
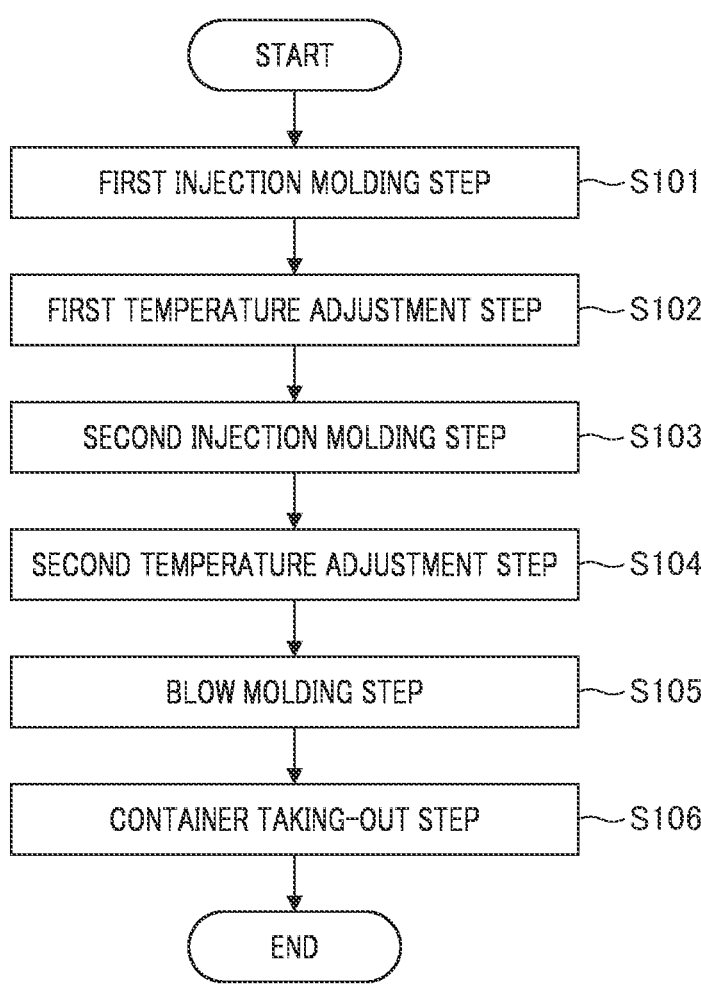
FIG. 8 is a flowchart illustrating steps of a method of manufacturing the container.

Next, a manufacturing method of the container 10 by the blow molding apparatus 30 of the present embodiment will be described. FIG. 8 is a flowchart illustrating steps of the manufacturing method of the container 10.

(Step S101: First Injection Molding Step)

First, as illustrated in FIGS. 4A and 5A, in the first injection molding unit 31, the first resin material is injected from the first injection device 38 into the mold space formed by the cavity mold 40, the core mold 41, and the neck mold 37b of the conveyance mechanism 37, and the first layer 25 of the preform 20 is molded.

Figure 6:
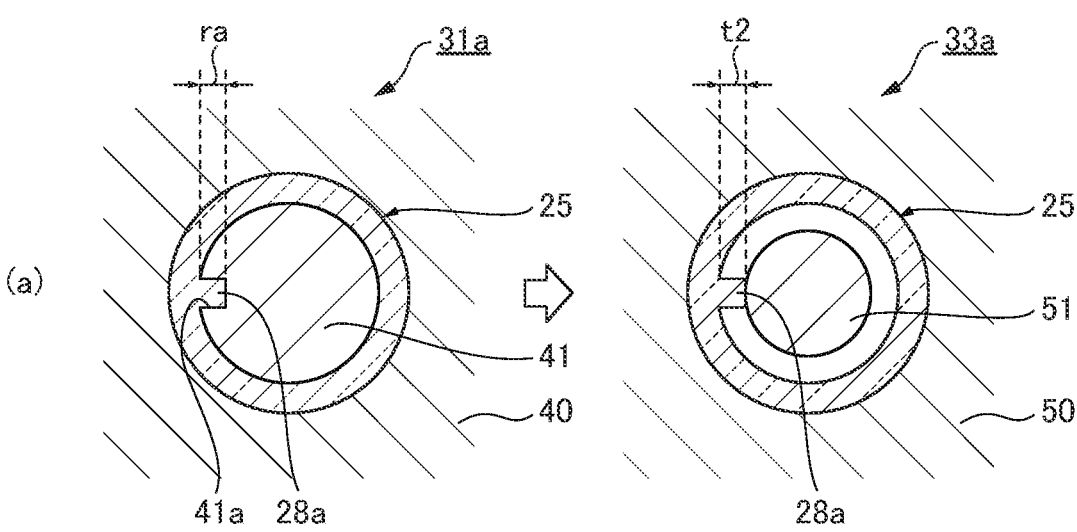
FIGS. 6A and 6B are cross-sectional views illustrating a step of manufacturing the preform.
Figure 6:
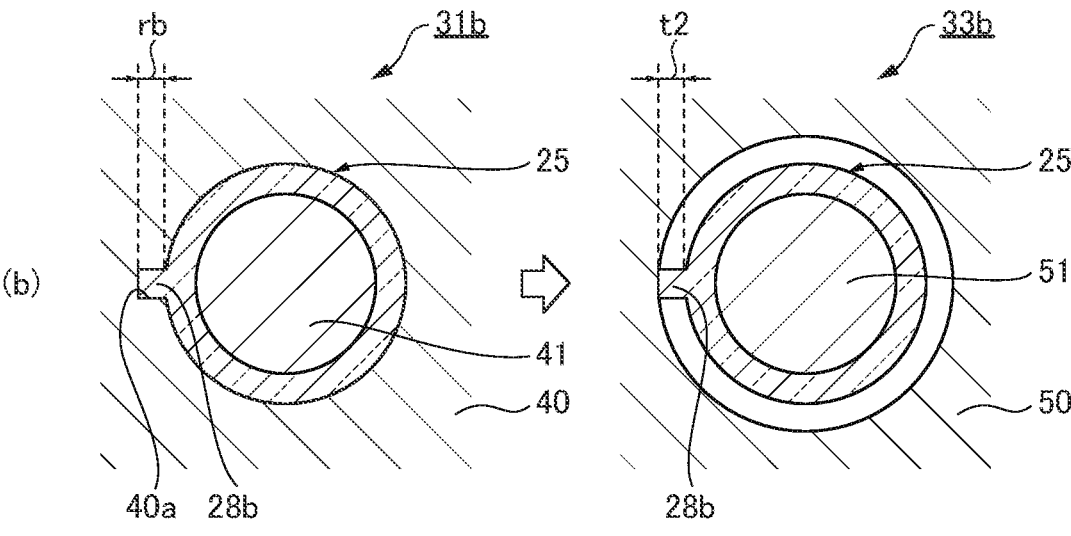

When the preform 20 of the first example is molded, the first injection molding unit 31a is used, and the first layer 25 having the convex portion 28a on the inner peripheral side thereof is molded, as illustrated in FIG. 6A. A protruding amount ra of the convex portion 28a in the radial direction is set to be longer than a thickness t2 of the second layer 26 according to the radial dimension of the groove 41a of the core mold 41.

In the first injection molding unit 31a, as illustrated in FIG. 4b, after the first layer 25 of the preform 20 is molded, a step of causing the valve pin 43 to protrude up to a position close to the core mold 41 is performed. As a result, the thin film portion 27a having a thickness thinner than that of the peripheral portion is formed at the center of the bottom portion of the first layer 25.

On the other hand, when the preform 20 of the second example is molded, the first injection molding unit 31b is used, and the first layer 25 having the convex portion 28b on the outer peripheral side thereof is molded, as illustrated in FIG. 6B. A protruding amount rb of the convex portion 28b in the radial direction is set to be longer than a thickness t2 of the second layer 26 according to the radial dimension of the groove 40a of the cavity mold 40.

Thereafter, when the molds of the first injection molding unit 31 are opened, the rotating plate 37a of the conveyance mechanism 37 rotates by a predetermined angle, and the first layer 25 of the preform 20 held by the neck mold 37b is conveyed to the first temperature adjustment unit 32 in a state of containing residual heat from injection molding.

(Step S102: First Temperature Adjustment Step)

Next, in the first temperature adjustment unit 32, the first layer 25 of the preform 20 is accommodated in a mold unit for temperature adjustment, and cooling of the first layer 25 and adjustment of temperature distribution (temperature equalization and removal of uneven temperature) are performed. Thereafter, the rotating plate 37a of the conveyance mechanism 37 rotates by a predetermined angle, and the first layer 25 of the preform 20 held by the neck mold 37b is conveyed to the second injection molding unit 33.

(Step S103: Second Injection Molding Step)

Subsequently, the first layer 25 of the preform 20 is accommodated in the second injection molding unit 33, and injection molding of the second layer 26 is performed. The second injection molding unit 33a is used when the preform 20 of the first example is molded, and the second injection molding unit 33b is used when the preform 20 of the second example is molded.

As illustrated in FIGS. 4C and 6A, in the second injection molding unit 33a, a mold space is formed between the inner peripheral side of the first layer 25 and the core mold 51 facing the inner periphery of the first layer 25, the mold space being formed from the neck portion 22 of the first layer 25 to the bottom portion 24 thereof. Since the protrusion amount ra of the convex portion 28a in the radial direction is longer than the thickness t2 of the second layer 26, when the first layer 25 is accommodated in the second injection molding unit 33a and the molds are closed, the convex portion 28a of the first layer is pressed against the core mold 51 and closely contacts thereto (refer to FIG. 6A). Therefore, generation of a gap between the convex portion 28a of the first layer 25 and the core mold 51 can be suppressed, and as such, the second resin material can be prevented from flowing into the inner surface side of the convex portion 28a. As a result, a region where the first layer 25 is exposed can be formed on the inner peripheral side of the preform 20 of the first example.

The mold space is filled with the second resin material from the hot runner mold 52. Although the thin film portion 27a is formed at the bottom portion of the first layer 25, the thin film portion 27a is broken by the injection pressure of the second resin material to form the hole 27 at the bottom portion, and as such, the second resin material is guided from the hole 27 to the inner peripheral side of the first layer 25.

As illustrated in FIG. 4C, the cavity mold 50 faces the outer peripheral side of the first layer 25, and the shape of the first layer 25 is held by the cavity mold 50 from the outer peripheral side. Therefore, even when the second resin material comes into contact with the first layer 25, thermal deformation of the first layer 25 can be suppressed.

In addition, a space of a resin reservoir is formed between the hole 27 of the first layer 25 and the recessed portion 51a of the core mold 51. The second resin material that has passed through the hole 27 hits the recessed portion 51a of the core mold 51 and is stirred in the space of the resin reservoir, and then flows into the mold space between the inner periphery of the first layer 25 and the surface of the core mold 51. As the second resin material is stirred in the space of the resin reservoir, fragments of the thin film portion 27a of the first layer 25 are mixed with the high-temperature second resin material and melted. Accordingly, it is possible to dissipate the fragments of the thin film portion 27a to such an extent that the fragments cannot be visually recognized.

Furthermore, in the second injection molding unit 33a, the axial depth of the mold space of the cavity mold 50 accommodating the first layer 25 is shorter than the axial length of the first layer 25. Therefore, the bottom portion 24 of the first layer 25 is pressed against the bottom surface of the cavity mold 50, and as such, generation of a gap between the bottom portion 24 of the first layer 25 and the cavity mold 50 is suppressed. Therefore, the second resin material hardly flows into a space between the first layer 25 and the cavity mold 50, and as such, occurrence of molding defects in which the second resin material covers the outer periphery of the first layer 25 is suppressed.

As described above, when the preform 20 of the first example is molded, the second layer 26 can be formed on the inner peripheral side of the first layer 25.

On the other hand, in the second injection molding unit 33b, as illustrated in FIGS. 5B and 6B, a mold space is formed between the outer peripheral side of the first layer 25 and the cavity mold 50 facing the outer periphery of the first layer 25, the mold space being formed from the body portion 23 of the first layer 25 to the bottom portion 24 thereof. Since the protrusion amount rb of the convex portion 28b in the radial direction is longer than the thickness t2 of the second layer 26, when the first layer 25 is accommodated in the second injection molding unit 33b and the molds are closed, the convex portion 28b of the first layer 25 is pressed against the cavity mold 50 and closely contacts thereto (refer to FIG. 6B). Therefore, generation of a gap between the convex portion 28b of the first layer 25 and the cavity mold 50 can be suppressed, and as such, the second resin material can be prevented from flowing into the outer surface side of the convex portion 28b. As a result, a region where the first layer 25 is exposed can be formed on the outer peripheral side of the preform 20 of the second example.

The mold space is filled with the second resin material from the hot runner mold 52. As illustrated in FIG. 5B, the core mold 51 is inserted into the inner peripheral side of the first layer 25, and the shape of the first layer 25 is held by the core mold 51 from the inner peripheral side. Therefore, even when the second resin material comes into contact with the first layer 25, thermal deformation of the first layer 25 can be suppressed. When the preform of the second example is molded as described above, the second layer 26 can be formed on the outer peripheral side of the first layer 25.

As described above, the preform 20 of the first example or the second example is manufactured by the first injection molding step and the second injection molding step.

Thereafter, when the molds of second injection molding unit 33 are opened, the rotating plate 37*a* of the conveyance mechanism 37 rotates by a predetermined angle, and the preform 20 held by the neck mold 37*b* is conveyed to the second temperature adjustment unit 34 in a state of containing residual heat from injection molding.

(Step S104: Second Temperature Adjustment Step)

Subsequently, the preform 20 is accommodated in the second temperature adjustment unit 34, and temperature adjustment is performed to bring the temperature of the preform 20 closer to a temperature suitable for final blowing.

As illustrated in FIGS. 7A and 7B, in the second temperature adjustment unit 34, the position of the convex portion 28*a* (28*b*) of the preform 20 is locally heated from the inner peripheral side by the heating piece 62 of the heating rod 61.

The position of the convex portion 28*a* (28*b*) of the preform 20 is formed of the first resin material over the entire region in the radial direction. Therefore, the position of the convex portion 28*a* (28*b*) of the preform 20 has smaller residual heat than the region where the second resin material having a high temperature is laminated in the second injection molding unit 33, and is hardly deformed during blow molding. By locally heating the position of the convex portion 28*a* (28*b*) by the second temperature adjustment unit 34, the uneven temperature in the circumferential direction of the preform 20 decreases, and particularly, the formativeness of the light-transmitting region 16 of the container 10 can be improved.

Thereafter, the rotating plate 37*a* of the conveyance mechanism 37 rotates by a predetermined angle, and the preform 20 after the temperature adjustment held in the neck mold 37*b* is conveyed to the blow molding unit 35.

(Step S105: Blow Molding Step)

Subsequently, in the blow molding unit 35, the container 10 is blow-molded.

First, the blow cavity mold is closed, the preform 20 is accommodated in the mold space, and the air introduction member (blow core) is lowered. In this manner, the air introduction member abuts on the neck portion 22 of the preform 20. Then, the stretching rod is lowered to press the bottom portion 24 of the preform 20 from the inner surface, and blow air is supplied from the air introduction member while performing longitudinal axis stretching as necessary, thereby laterally axially stretching the preform 20. As a result, the preform 20 is bulged and shaped so as to be in close contact with the mold space of the blow cavity mold, and is blow-molded in the container 10. When the preform 20 is longer than the container 10, the bottom mold waits at a lower position not in contact with the bottom portion 24 of the preform 20 before closing the blow cavity mold, and is quickly raised to the molding position after closing the mold.

In the present embodiment, by blow-molding the preform 20 of the first example or the second example, the non-light-transmitting region 15 of the container 10 is formed by stretching the second layer 26, and the light-transmitting region 16 of the container 10 is formed by stretching the convex portion of the first layer 25. As a result, the container 10 in which a stripe-shaped window is formed in the body portion 13 is manufactured.

(Step S106: Container Taking-Out Step)

When the blow molding is completed, the blow cavity mold is opened. As a result, the container 10 is movable from the blow molding unit 35.

Subsequently, the rotating plate 37*a* of the conveyance mechanism 37 rotates by a predetermined angle, and the container 10 is conveyed to the taking-out unit 36. In the taking-out unit 36, the neck portion 12 of the container 10 is opened from the neck mold 37*b*, and the container 10 is taken out to the outside of the blow molding apparatus 30.

As described above, one cycle in the manufacturing method of the container 10 ends. Thereafter, by rotating the rotating plate 37*a* of the conveyance mechanism 37 by a predetermined angle, the respective steps of S101 to S106 described above are repeatedly performed. During operation of the blow molding apparatus 30, six sets of containers having a time difference of one step are manufactured in parallel.

Further, due to the structure of the blow molding apparatus 30, the respective times of the first injection molding step, the first temperature adjustment step, the second injection molding step, the second temperature adjustment step, the blow molding step, and the container taking-out step are the same. Similarly, the conveyance time between the steps is the same.

As described above, in the present embodiment, the first layer 25 having the vertical stripe-shaped convex portions 28*a* and 28*b* is injection-molded in the first injection molding step, and the second layer 26 is injection-molded in a region other than the convex portion in the inner peripheral portion or the outer peripheral portion of the first layer 25 in the second injection molding step, whereby the preform 20 having a multilayer structure suitable for a container with a window is manufactured. In the present embodiment, since the transparent material and the colored material are injection-molded in two stages, it is not necessary to inject the transparent material and the colored material simultaneously at the time of injection molding, and manufacturing costs of the preform 20 can be reduced as compared with the three-layer molding method.

In addition, in the present embodiment, a hot parison method is adopted in which blow molding is performed in a state of containing residual heat from injection molding. For example, as compared with a case where a preform having a multilayer structure is manufactured by fitting cooled preforms, and blow molding is performed after reheating (cold parison method), in the present embodiment, it is not necessary to cool the preform up to near normal temperature, and a step of assembling and reheating the preform is also unnecessary. Therefore, according to the present embodiment, a series of steps from injection molding of the preform 20 to blow molding of the container 10 can be completed in a relatively short time. As a result, the container 10 having the stripe-shaped window in the body portion 13 can be manufactured in a shorter cycle, and the manufacturing costs of the container 10 can be greatly reduced as compared with the related art.

Furthermore, in the present embodiment, the container is manufactured by so-called stretch blow molding in which the preform 20 is blow-molded while being stretched. Therefore, in the present embodiment, the aesthetic appearance and dimensional accuracy of the container 10 can be improved as compared with the container of the extrusion blow molding method. In addition, in the present embodiment, since the generation of waste material can be suppressed as compared with the extrusion blow molding method, the manufacturing costs of the container 10 can be reduced also in this respect.

Modifications of Embodiment

The present invention is not limited to the above-described embodiment, and various improvements and design changes may be made without departing from the gist of the present invention.

Figure 9:
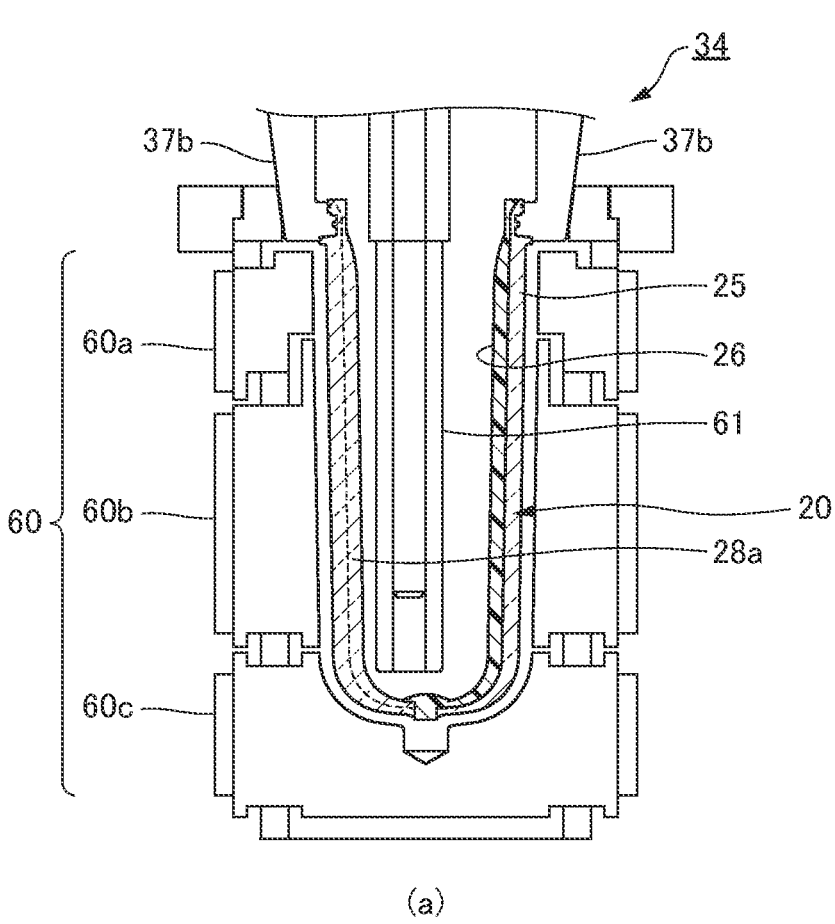
FIGS. 9A and 9B are diagrams illustrating a modification of the second temperature adjustment unit.
Figure 9:
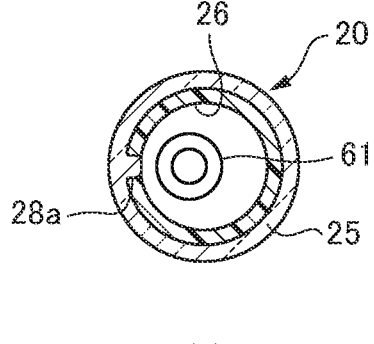

The configuration of the second temperature adjustment unit 34 is not limited to the configuration in which the preform 20 is locally heated using the heating rod 61 having the heating piece 62 attached thereto as in the above-described embodiment. For example, as illustrated in FIGS. 9A and 9B, the heating rod 61 may be brought close to the convex portion 28a (28b) of the preform 20 to eccentrically dispose the heating rod 61 with respect to the central axis. In the configuration of FIGS. 9A and 9B as well, the convex portion 28a (28b) of the preform is locally heated from the inner peripheral side, and the same effect as that of the above-described embodiment can be obtained.

At this time, the uneven temperature of the convex portion 28a (28b) of the preform 20 may be further controlled by adjusting the gap of the cavity mold 60 of the second temperature adjustment unit 34 with respect to the convex portion 28a (28b) of the preform 20.

Further, in the case of the first temperature adjustment unit 32 of the above-described embodiment as well, in the same manner as that of the second temperature adjustment unit 34, the convex portions 28a and 28b of the preform 20 may be locally heated.

In the above-described embodiment, the first temperature adjustment step between the first injection molding step and the second injection molding step may be omitted. That is, the blow molding apparatus 30 may not include the first temperature adjustment unit 32, and the first injection molding unit 31, the second injection molding unit 33, the second temperature adjustment unit 34, the blow molding unit 35, and the taking-out unit 36 may be configured to be disposed at positions rotated by seventy-two degrees around the conveyance mechanism 37 (five-station machine).

In addition, in the preform 20 of the second example illustrated in FIGS. 2C and 2D of the above-described embodiment, a recycled material (for example, a pulverized material (flake material)) may be used as the resin material of the outer layer (second layer 26) that is not exposed to the inner peripheral side and is not in contact with the contents.

In addition, the embodiments disclosed herein are to be considered in all respects as illustrative and not restrictive. The scope of the present invention is indicated not by the above description but by the scope of the claims, and is intended to include all modifications within the meaning and the scope equivalent to the scope of the claims.

The invention claimed is:

1. A manufacturing method of a resin container, the manufacturing method comprising:

injection-molding a first layer of a preform having a convex portion extending in an axial direction on an inner peripheral surface or an outer peripheral surface as a first injection molding, the preform being formed in a bottomed cylindrical shape, using a first resin material having a light-transmitting property;

injecting a colored second resin material on a surface side on which the convex portion of the first layer is formed and laminating a colored second layer in a region excluding the convex portion of the first layer while exposing the convex portion in the axial direction as a second injection molding;

arranging a heating member extending in the axial direction within the preform obtained in the second injection molding to adjust a temperature of a preform as a temperature adjustment; and blow-molding the preform after the temperature adjustment a state of having residual heat from injection molding to manufacture the resin container, wherein the resin container has a light-transmitting region extending in the axial direction by shaping the convex portion and a non-light-transmitting region by shaping the second layer, and in the temperature adjustment, a first distance between the heating member and the convex portion in the radial direction of preform is set to be shorter than a second distance between the heating member and portions other than the convex portion, and at least a position of the convex portion in the circumferential direction of the preform is locally heated.

2. The manufacturing method of a resin container according to claim 1, wherein in the first injection molding, the convex portion is formed on the inner peripheral surface of the first layer, and in the second injection molding, the second resin material is injected between the inner peripheral surface of the first layer and a mold disposed on an inner peripheral side of the first layer, and the second layer is laminated on the inner peripheral side of the first layer while the convex portion is exposed on the inner peripheral surface of the preform.

3. The manufacturing method of a resin container according to claim 1, wherein in the first injection molding, the convex portion is formed on the outer peripheral surface of the first layer, and in the second injection molding, the second resin material is injected between the outer peripheral surface of the first layer and a mold disposed on an outer peripheral side of the first layer, and the second layer is laminated on the outer peripheral side of the first layer while the convex portion is exposed on the outer peripheral surface of the preform.

4. The manufacturing method of a resin container according to claim 1, wherein a radial dimension of the convex portion in the first layer obtained in the first injection molding is larger than a thickness of the second layer, and in the second injection molding, a tip of the convex portion is pressed against a mold of the second layer facing in the radial direction.

* * * * *